United States Patent
Michael et al.

(10) Patent No.: US 12,094,310 B2
(45) Date of Patent: Sep. 17, 2024

(54) METHOD AND SYSTEM FOR DETECTING FIRE AND SMOKE

(71) Applicant: HENDRICKS CORP PTE LTD, Singapore (SG)

(72) Inventors: Michael Michael, Singapore (SG); Chuan Hun Ye, Singapore (SG)

(73) Assignee: HENDRICKS CORP PTE LTD, Singapore (SG)

( * ) Notice: Subject to any disclaimer, the term of this patent is extended or adjusted under 35 U.S.C. 154(b) by 240 days.

(21) Appl. No.: 17/604,190

(22) PCT Filed: Apr. 17, 2019

(86) PCT No.: PCT/SG2019/050216
§ 371 (c)(1),
(2) Date: Oct. 15, 2021

(87) PCT Pub. No.: WO2020/214084
PCT Pub. Date: Oct. 22, 2020

(65) Prior Publication Data
US 2022/0198801 A1    Jun. 23, 2022

(51) Int. Cl.
*G06K 9/00* (2022.01)
*G06T 7/12* (2017.01)
(Continued)

(52) U.S. Cl.
CPC ............... *G08B 17/10* (2013.01); *G06T 7/12* (2017.01); *G06T 7/269* (2017.01); *G06V 10/44* (2022.01); *G06V 20/00* (2022.01); *G06V 20/50* (2022.01); *G06T 2207/10016* (2013.01); *G06T 2207/10024* (2013.01)

(58) Field of Classification Search
None
See application file for complete search history.

(56) References Cited

U.S. PATENT DOCUMENTS

| 2011/0064264 | A1 | 3/2011 | Caballero et al. |
| 2018/0168020 | A1* | 6/2018 | Casey ............. H05B 47/125 |

FOREIGN PATENT DOCUMENTS

| CN | 201091014 | 7/2008 |
| CN | 101944267 | 1/2011 |

(Continued)

OTHER PUBLICATIONS

Wu ("A Video Based Fire Smoke Detection Using Robust AdaBoost", Sensors 2018, 18, 3780; pp. 1-22) (Year: 2018).*

(Continued)

*Primary Examiner* — Wei Wen Yang
(74) *Attorney, Agent, or Firm* — Vierra Magen Marcus LLP

(57) ABSTRACT

This invention relates to a method and system for detecting fire and smoke. The system comprises a processor, a memory and instructions stored on the memory and executable by the processor to: receive a sequence of images from a plurality of cameras; sampling the sequence of images at a certain interval; process each of the sampled images to form a first processed image and a second processed image; extract Binary Large Objects (BLOBs) from first processed image and contours of objects from the second processed image; analyse the BLOB for smoke and the contours of objects for fire; and determine smoke in response to analysing smoke from the BLOBs and fire in response to analysing fire from the contours of objects.

14 Claims, 15 Drawing Sheets

(51) Int. Cl.
*G06T 7/269* (2017.01)
*G06V 10/44* (2022.01)
*G06V 20/00* (2022.01)
*G06V 20/50* (2022.01)
*G08B 17/10* (2006.01)

(56) References Cited

FOREIGN PATENT DOCUMENTS

| | | |
|---|---|---|
| CN | 104794486 | 7/2015 |
| CN | 106897720 | 6/2017 |
| CN | 107067412 | 8/2017 |
| CN | 107085714 | 8/2017 |

OTHER PUBLICATIONS

Vijayalakshmi ("Smoke detection in video images using background subtraction method for early fire alarm system", Proceedings of the 2nd International Conference on Communication and Electronics Systems (ICCES 2017)pp. 167-171) (Year: 2017).*

International Search Report and Written Opinion date Jul. 16, 2019 in PCT Patent Application No. PCT/SG2018/050216.

English language Abstract for CN106897720 published Jun. 27, 2017.

English language Abstract for CN101944267 published Jan. 12, 2011.

English language Abstract for CN201091014 published Jun. 23, 2008.

English language Abstract for CN107085714 published Aug. 22, 2017.

English language Abstract for CN104794486 published Jul. 22, 2015.

English language Abstract for CN107067412 published Aug. 18, 2017.

Zhang et al., "Image Based Forest Fire Detection Using Dynamic Characteristics With Artificial Neural Networks," 2009 International Joint Conference on Artificial Intelligence, Apr. 26, 2009.

* cited by examiner

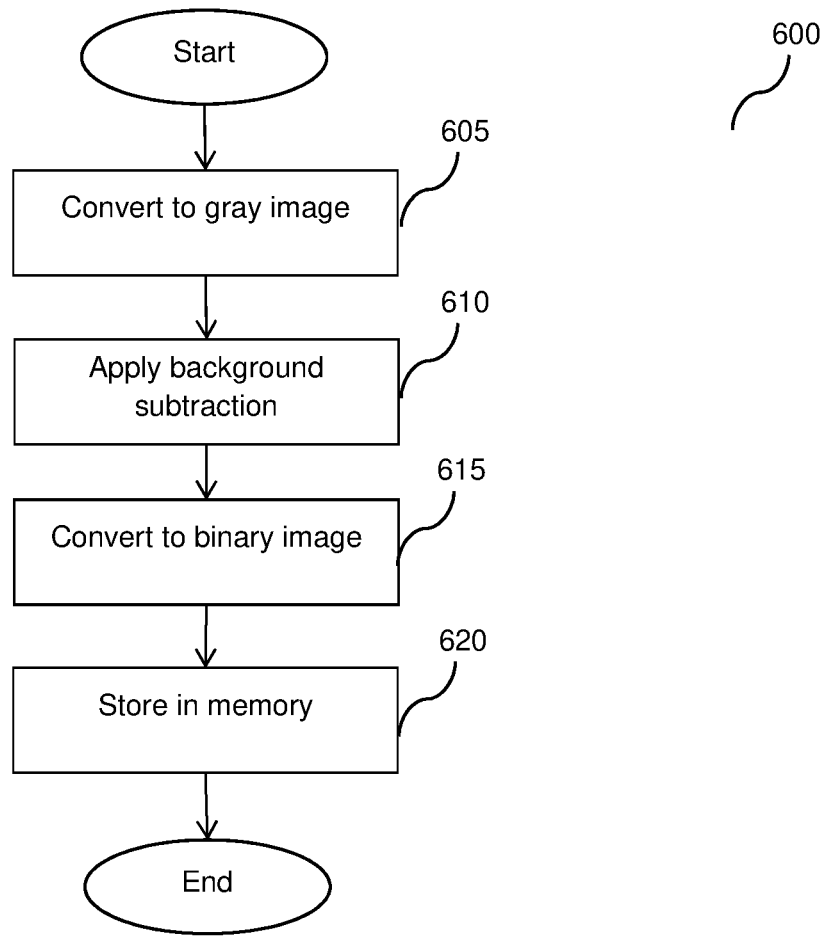
Figure 6.1

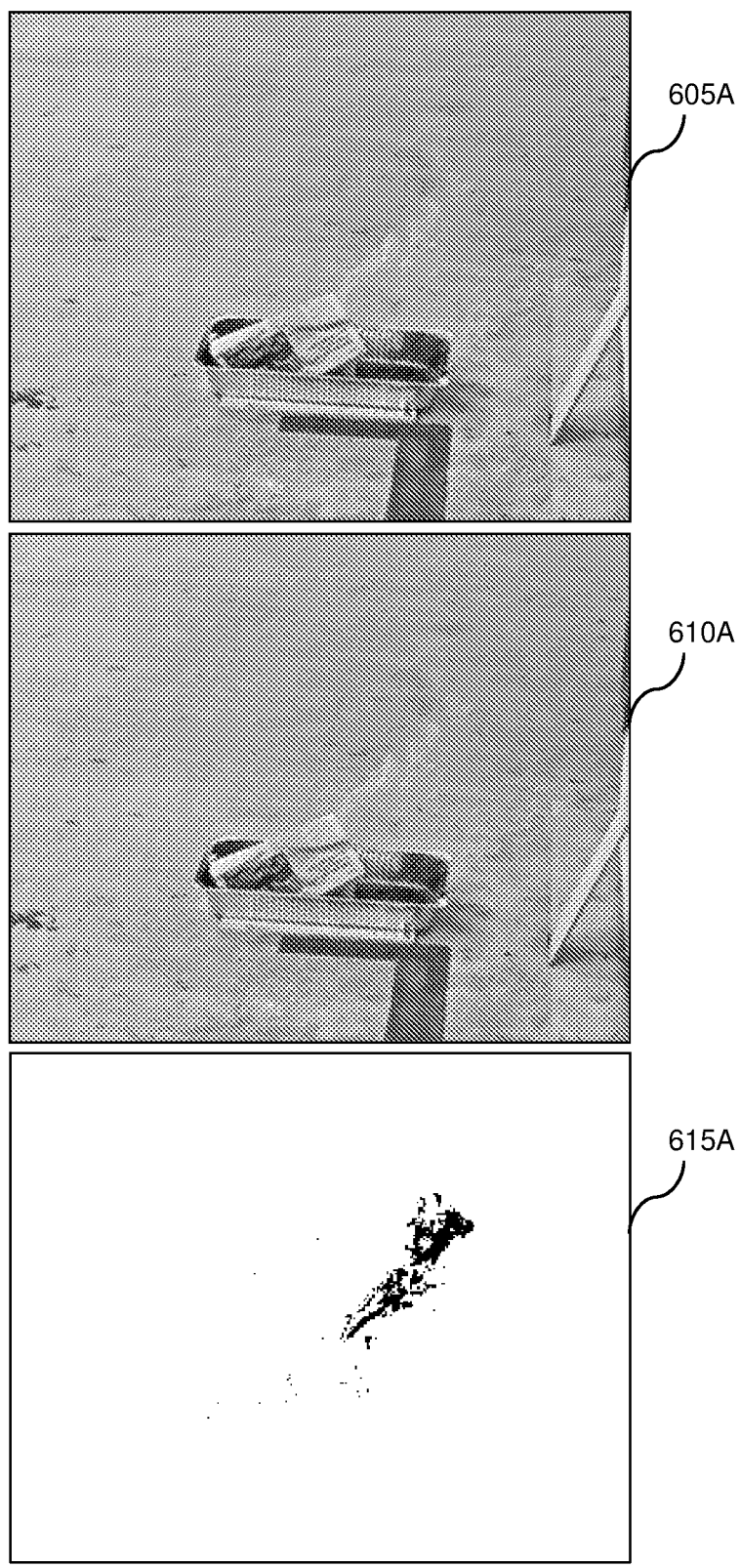
Figure 6.2

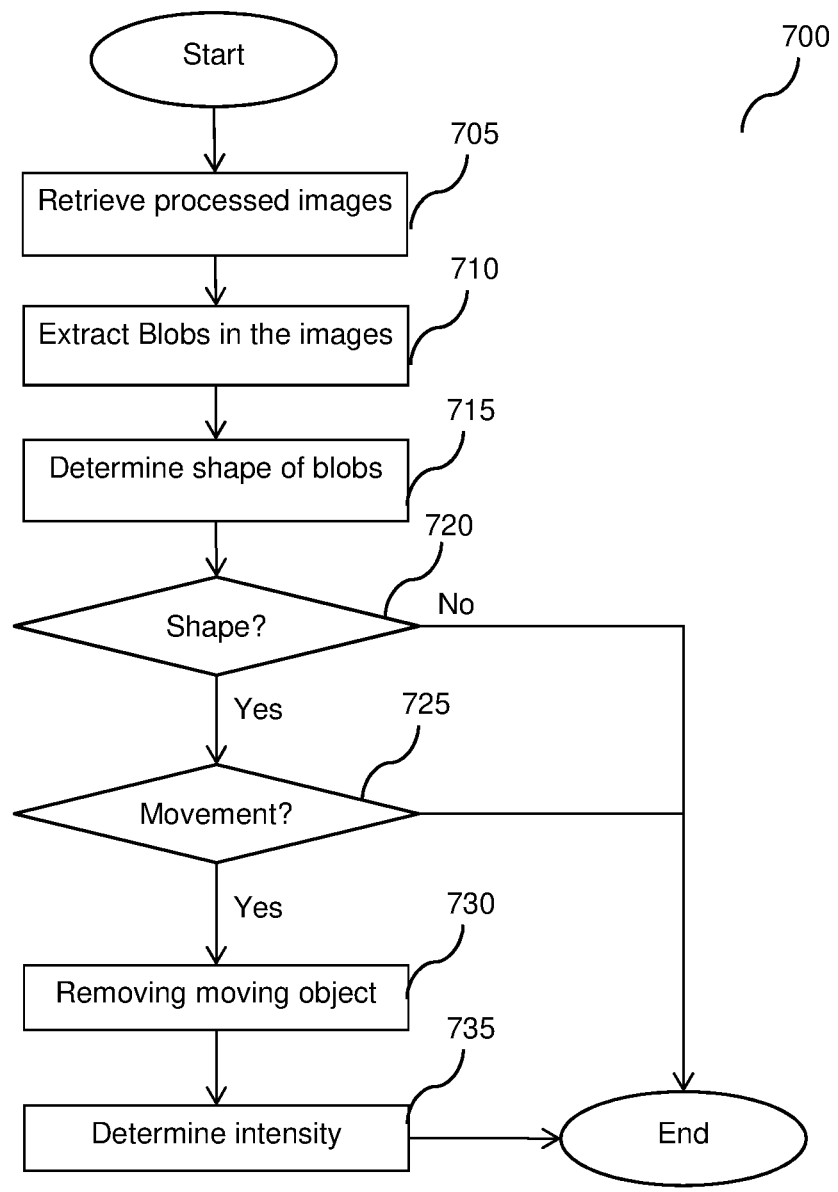
Figure 7.1

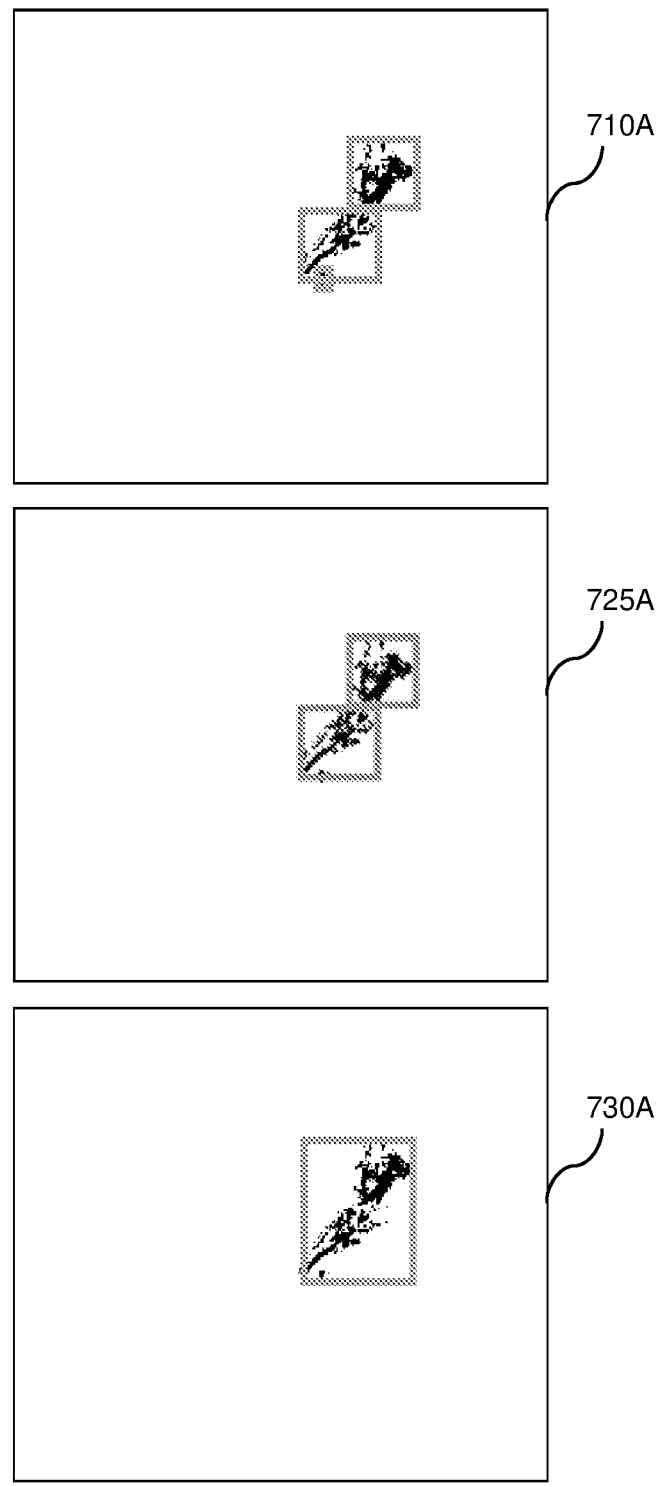
Figure 7.2

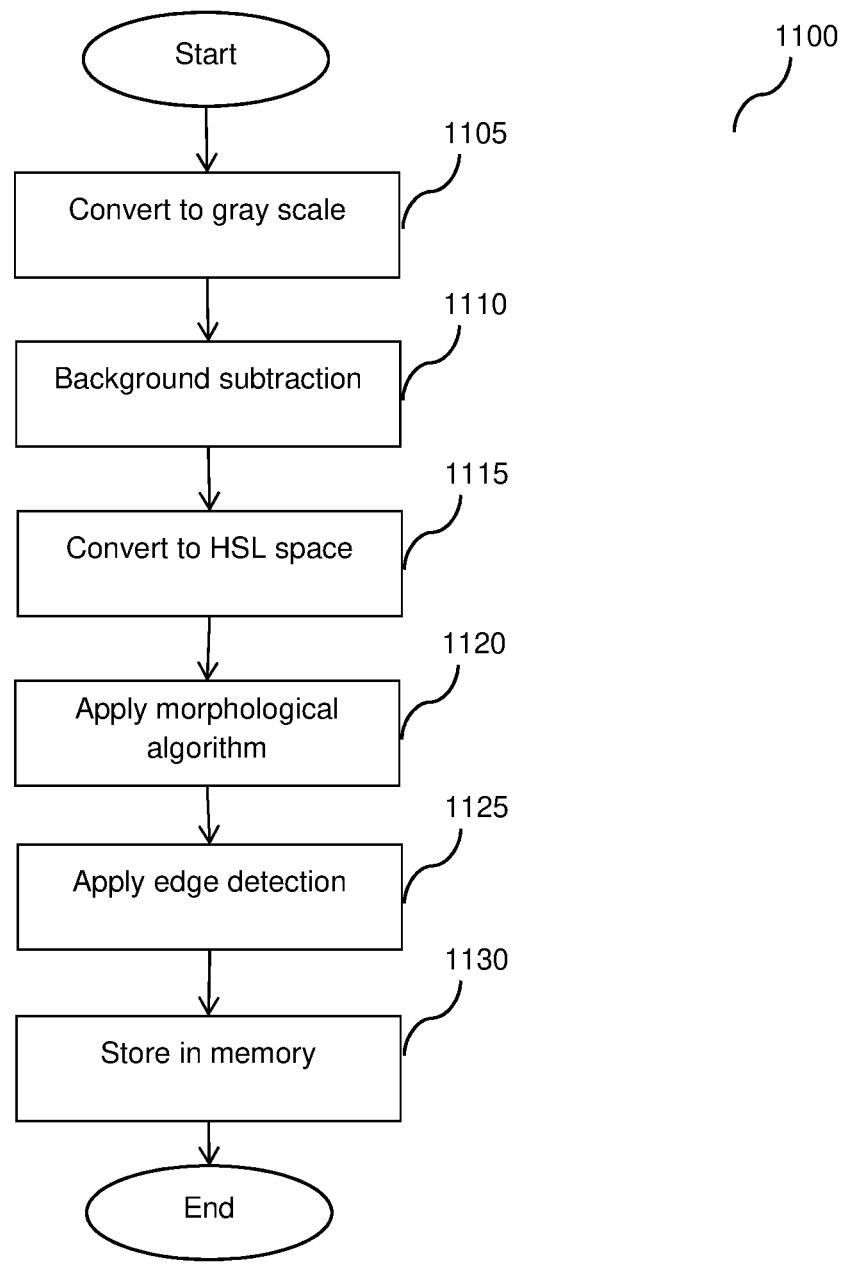
Figure 11.1

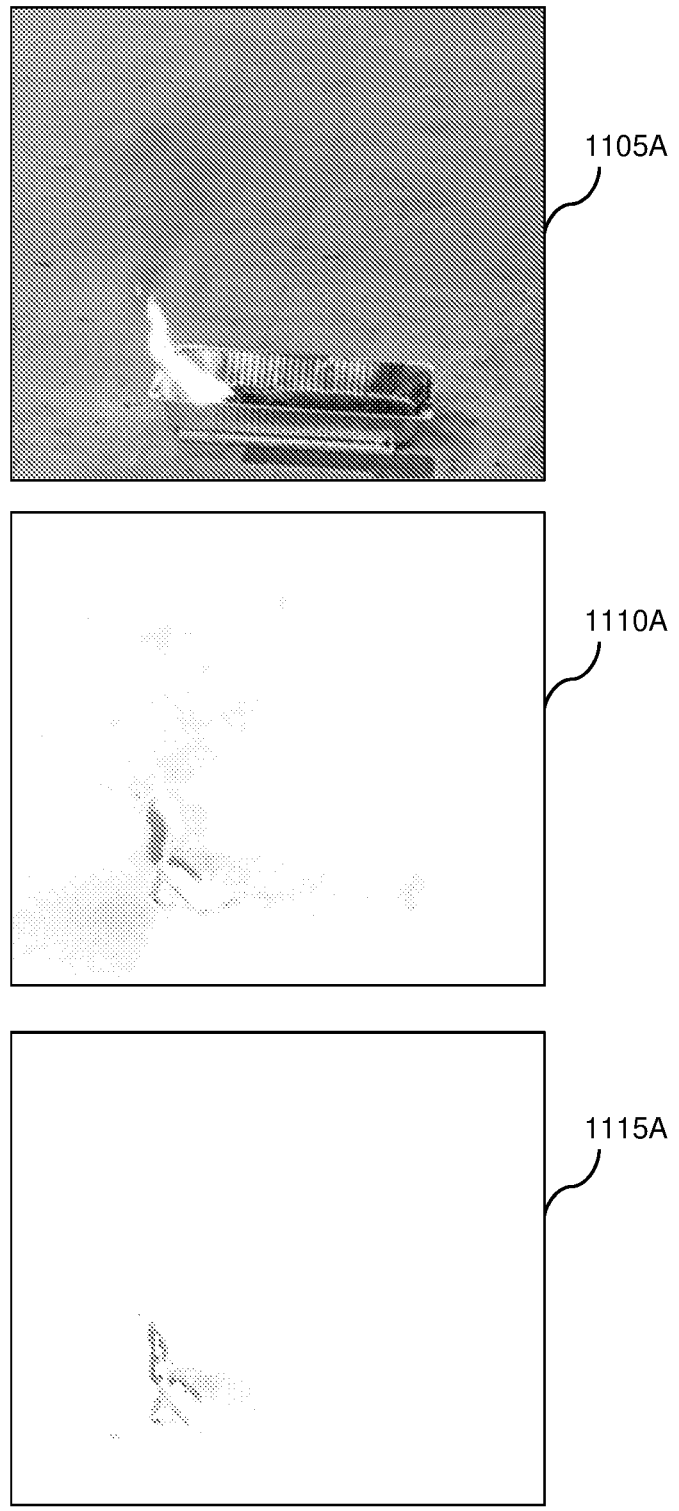
Figure 11.2

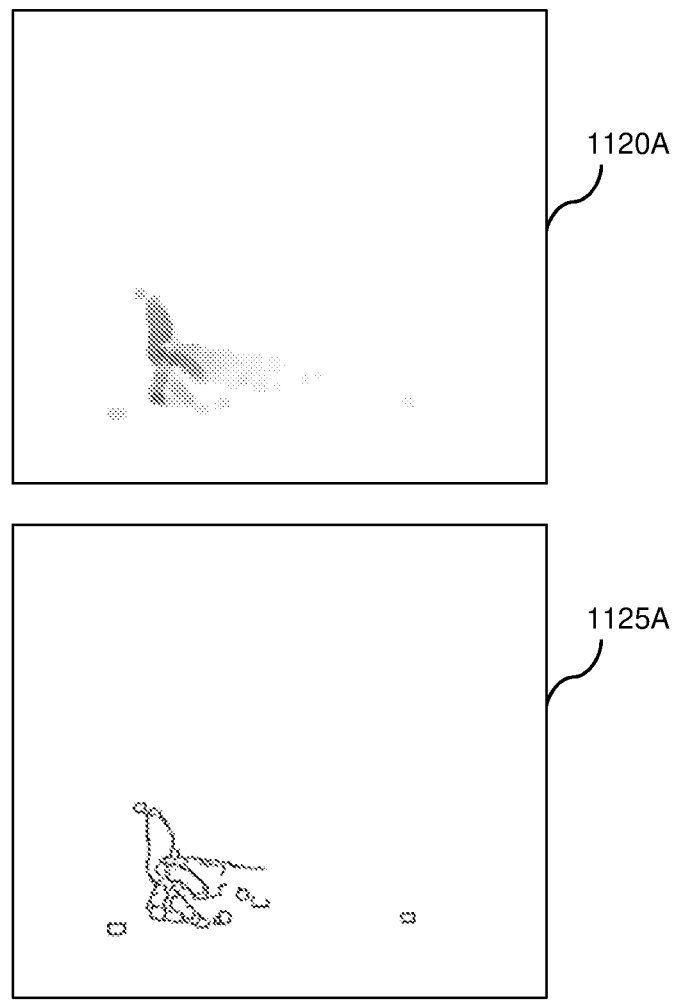
Figure 11.3

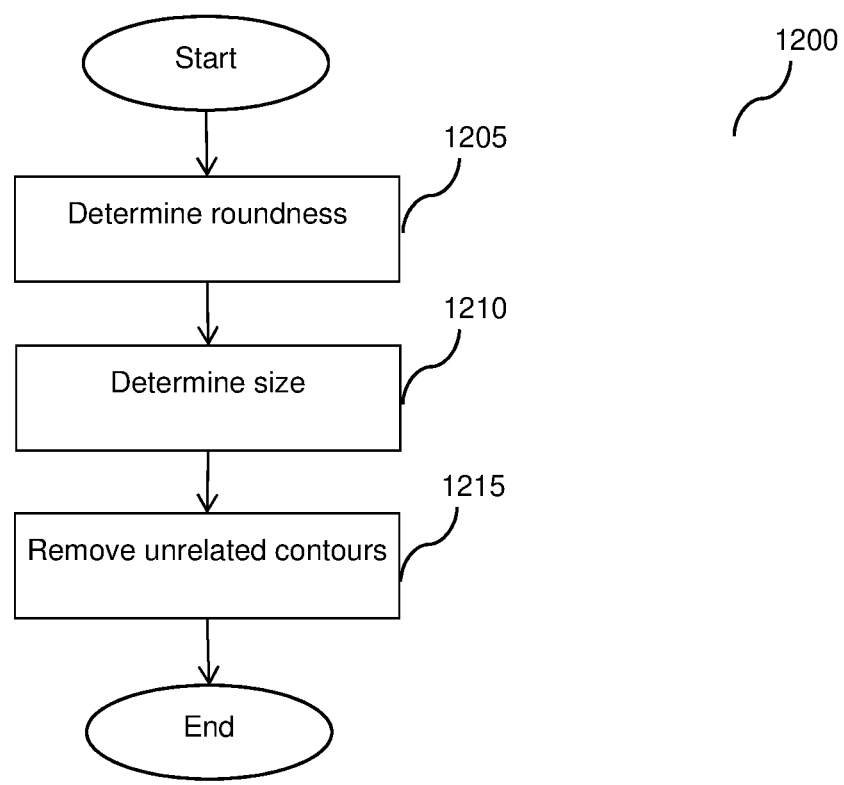
Figure 12.1

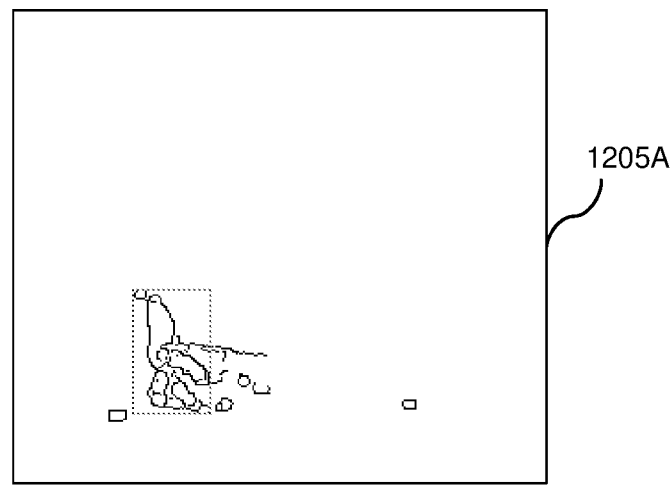
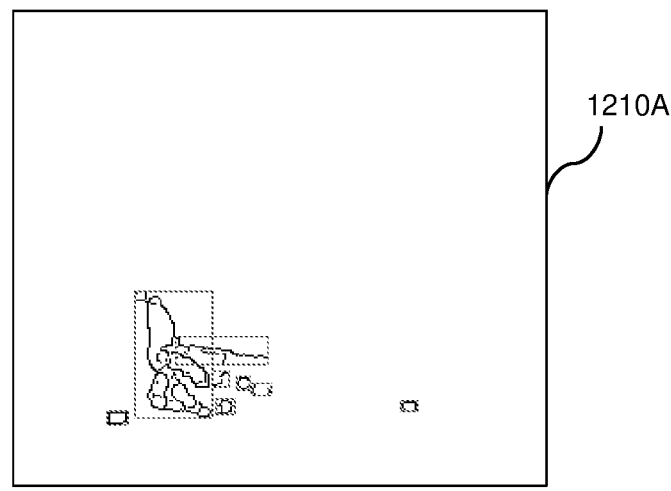
Figure 12.2
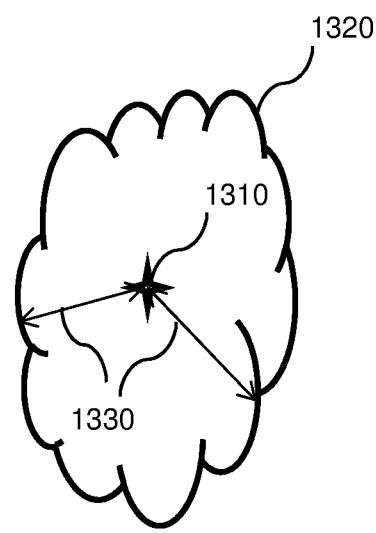
Figure 13

METHOD AND SYSTEM FOR DETECTING FIRE AND SMOKE

FIELD OF INVENTION

This invention relates to a method and a system that detects fire and/or smoke from a video feed.

BACKGROUND

Fire and smoke detection systems aim to discover fires as early as possible to that sufficient time is available for safe evacuation. Early detection also plays a role in reducing damages to the properties as fires can be put out more efficiently when they are at the development stage.

Existing products such as fire and smoke detectors are only able to detect fire that is in enclosed spaces, and the area of coverage is limited to the size of the fire in many cases. In particular, most of these fire and smoke detectors are based on particle sampling, temperature sampling, relative humidity sampling, air transparency testing, smoke analysis, etc. Essentially, multiple sensors are required in order to provide early detection of fire and smoke. However, even with the use of multiple sensors, the performance of detecting fire and smoke is still not desirable. For example, the detection sensors require the sampling of the surroundings proximate the detection sensors. However, as commonly known such detection sensors are typically installed at ceilings or hidden places. This means that the fire would have at least developed into a concerning stage before the detection sensors pick up traces of the fire and smoke. Furthermore, such detection sensors can only work in an enclosed environment.

Thus, those skilled in the art are constantly striving to provide a method and a system that allows detection of fire and smoke more effectively.

SUMMARY OF INVENTION

The above and other problems are solved and an advance in the art is provided by a method and/or a system in accordance with this disclosure. A first advantage of a method and/or a system in accordance with embodiments of this disclosure is that it allows detection of fire and smoke in both indoor and outdoor environment. A second advantage of a method and/or system in accordance with embodiments of this disclosure is that fire and smoke can be detected at an earlier stage. A third advantage of a method and/or system in accordance with embodiments of this disclosure is that detection coverage can be easily expanded via the use of image capturing devices with wide angle lens. A fourth advantage of a method and/or system in accordance with embodiments of this disclosure is that fire and smoke detection can be easily implemented since cameras are already widely used and installed at various strategic places. A fifth advantage of a method and/or system in accordance with embodiments of this disclosure is that the system and/or method are capable of detecting both fire and smoke. This allows detection of fire that is hidden in the video frame.

A first aspect of the disclosure relates to a fire and smoke detection system comprising: a processor, a memory and instructions stored on the memory and executable by the processor to: receive a sequence of images from a plurality of cameras; sampling the sequence of images at a certain interval; process each of the sampled images to form a first processed image and a second processed image; extract Binary Large Objects (BLOBs) from first processed image and contours of objects from the second processed image; analyse the BLOB for smoke and the contours of objects for fire; and determine smoke in response to analysing smoke from the BLOBs and fire in response to analysing fire from the contours of objects.

In an embodiment of the first aspect of the disclosure, the instruction to process each of the sampled images to form the first processed image comprises instructions to: convert the sampled images to gray scale; apply background subtraction on the gray scale sampled images; and convert the background subtracted sampled images to binary images.

In an embodiment of the first aspect of the disclosure, the instruction to apply background subtraction on the gray scale sampled images comprises instructions to: obtain the background subtracted images for k number of sampled images with the following expression, $S(n)=I_c(n+1)-I_p(n)$ where $S(n)$ is the background subtracted image of current sampled image, $I_c(n+1)$ is next sampled image, $I_p(n)$ is current sampled image, $n=1, \ldots, k$.

In an embodiment of the first aspect of the disclosure, the instruction to obtain the background subtracted images for k number of sampled images further comprises instructions to: average each image in the background subtracted.

In an embodiment of the first aspect of the disclosure, the instruction to convert the background subtracted sampled images to binary images comprises instruction to: convert each pixel with a value above a certain threshold to 255 and 0 for the remaining pixels.

In an embodiment of the first aspect of the disclosure, the instruction to extract Binary Large Objects (BLOBs) from first processed image comprises instruction to: extract the BLOBs in each binary image.

In an embodiment of the first aspect of the disclosure, the instruction to analyse the BLOBs for smoke comprises instruction to: determine shape of BLOBs. In an embodiment of the first aspect of the disclosure, the instruction to determine shape of BLOBs comprises instructions to: determine number of corners and area of each BLOB; divide the number of corners by the area for each BLOB to determine a shape value for each BLOB; in response to the shape value being above a certain threshold, determine the BLOB as a smoke. In an embodiment of this embodiment, the certain threshold value is in the range of 0.001-0.1.

In an embodiment of the first aspect of the disclosure, the instruction to analyse the BLOB for smoke further comprises instructions to: determine a movement of the BLOBs that are determined as smoke; determine the BLOB is a movement of smoke in response to the BLOBs satisfying the following conditions: 1. current BLOB overlaps with two previous BLOBs; and 2. top coordinates of the current BLOB is smaller than the top coordinates of the two previous BLOBs.

In an embodiment of the first aspect of the disclosure, the instruction to analyse the BLOB for smoke further comprises instructions to: remove moving object.

In an embodiment of the first aspect of the disclosure, the instruction to remove moving object comprises instructions to: 1) determine a maximum smoke range; 2) detect some good feature points in the moving region in the current frame; 3) use optical flow to track the points, $(x_i, y_i)$, in previous $i^{th}$ frame; 4) use optical flow to track the points, $(x_{2i}, Y_{2i})$, in previous $(i*2)^{th}$ frame; 5) consider a point as a moving object in response to $x_i-x_0$ is about the same as $x_{2i}-x_i$ And $y_i-y_0$ is about the same as $y_{2i}-y_i$, one of the absolute value of $x_i-x_o$ and $y_i-y_o$ is bigger than a predefined threshold value.

In an embodiment of the first aspect of the disclosure, the instruction to analyse the BLOB for smoke further comprises instructions to: determine the intensity of the smoke.

In an embodiment of the first aspect of the disclosure, the instruction to determine the intensity of the smoke comprises instructions to: retrieve the sampled images; overlay the binary images with the BLOBs over corresponding sampled images; exclude BLOBs with average color channel R, G, B values that meet the following requirement: R>(G+B)/2+R/8; calculate a smoke BLOB Histogram, H; match the following condition, $$\frac{A}{4} = \sum_{k=0}^{T} H(k),$$

where A is an area of a BLOB, H is the BLOB histogram, T is the smoke intensity level, and k is the intensity variable which ranges between 0 to 255.

In an embodiment of the first aspect of the disclosure, the instruction to process each of the sampled images to form the second processed image comprises instructions to: convert the sampled images to gray scale; apply background subtraction on the gray scale sampled images to obtain foreground images; and convert the foreground images to Hue, Saturation and lightness (HSL) space; apply a morphological algorithm on the HSL foreground images; and apply an edge extraction algorithm to obtain the contours in each foreground images.

In an embodiment of the first aspect of the disclosure, the instruction to analyse the contours of objects for fire comprises instructions to: determine an average of X and Y coordinates for all contour pixels; determine a distance, $D_n$, between each contour pixel with reference to the average of X and Y coordinates for all contour pixels; determine an average distance, $D_A$, of all contour pixels with reference to the average of X and Y coordinates for all contour pixels; determine a roundness index, T, is determined by applying the following expression, $$T = 1 - \sum_{n=1}^{N} \frac{|D_A - D_n|}{N}$$

where N is the total amount of pixels in the contour, and remove contours with T<0.9.

In an embodiment of the first aspect of the disclosure, the instruction to analyse the contours of objects for fire comprises instructions to: determine a width, W, and a height, H, of each contour; and remove contours with width less than a first predetermined length and height less than a second predetermined length.

BRIEF DESCRIPTION OF DRAWINGS

The above and other features and advantages of a method and a system in accordance with this invention are described in the following detailed description and are shown in the following drawings:

FIG. 6.1 illustrating a flow diagram of a process performed by a smoke detection module to process an image in accordance with this disclosure;

FIG. 6.2 illustrating the resultant images from steps 605, 610 and 615 as illustrated by the process as shown in FIG. 6.1 in accordance with this disclosure;

FIG. 7.1 illustrating a flow diagram of a process performed by the smoke detection module to analyze an image in accordance with this disclosure;

FIG. 7.2 illustrating the resultant images from steps 710, 725 and 730 as illustrated by the process as shown in FIG. 7.1 in accordance with this disclosure;

FIG. 11.1 illustrating a flow diagram of a process performed by a fire detection module to process an image in accordance with this disclosure;

FIG. 11.2 illustrating the resultant images from steps 1105, 1110 and 1115 as illustrated by the process as shown in FIG. 11.1 in accordance with this disclosure;

FIG. 11.3 illustrating the resultant images from steps 1120 and 1125 as illustrated by the process as shown in FIG. 11.1 in accordance with this disclosure;

FIG. 12.1 illustrating a flow diagram of a process performed by the fire detection module to analyze an image in accordance with this disclosure;

FIG. 12.2 illustrating contours belonging to fire in accordance with this disclosure; and FIG. 13 illustrating a fire with a contour for determining the roundness index in accordance with this disclosure.

DETAILED DESCRIPTION

This invention relates to a method and a system that detects fire and/or smoke from a video feed.

Figure 1:
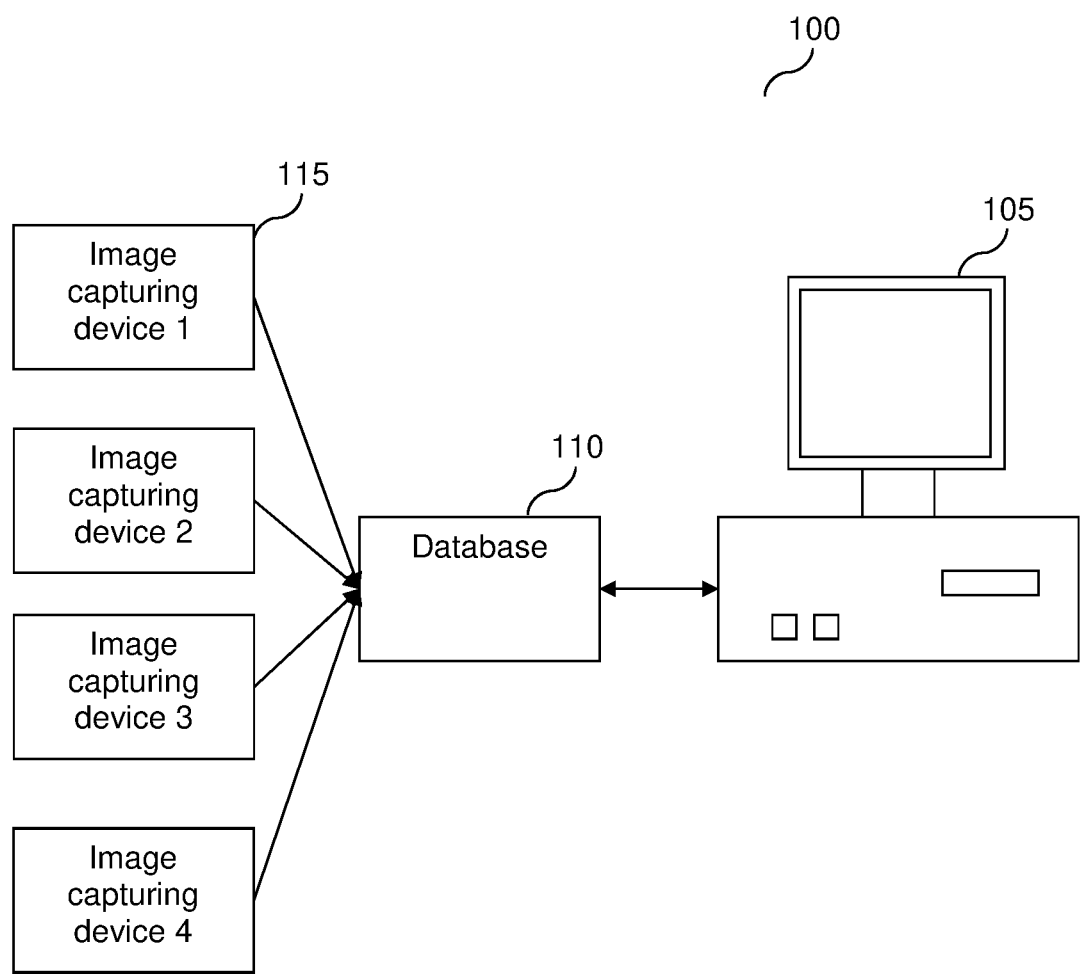
FIG. 1 illustrating a block diagram of a system for detecting fire and/or smoke from a sequence of images obtained from an image capturing device in accordance with this disclosure.

It is envisioned that a system and/or method in accordance with embodiments of this disclosure may be used to detect fire and/or smoke based on images captured by image capturing devices. FIG. 1 illustrates system 100 for automatically detecting fire and/or smoke in accordance with this disclosure. Beside detecting fire and smoke, the system 100 also tracks the time period of the fire and/or smoke. The system 100 includes a server 105, database 110 and image capturing devices 115.

Database 110 is a repository for sequence of images received from the image capturing device 115. The image capturing devices 115 are cameras or video cameras that are capable of capturing a sequence of images and are installed at various strategic locations under surveillance.

Server 105 is a typical processing system such as a desktop computer, laptop computer, or other computer terminal that is connected to database 110 via either a wired or wireless connection to access the sequence of images. Server 105 executes applications that perform the required processes in accordance with this disclosure. One skilled in the art will recognize that although only one server 105 is shown, any number of processing systems may be connected and/or operating in parallel to perform the applications for providing embodiments of this disclosure without departing from this disclosure.

The server 105 is a typical processing system such as a desktop computer, laptop computer, or other computer terminal capable of handling large data storage and processing need. In one embodiment, the server 105 is communicatively connected to the database 110 via a network to retrieve the sequence of images from image capturing devices 115. Network is a network such as the Internet that allows various servers and computing systems to communicate with one another. One skilled in the art will recognise that more than server 105 may be used without departing from the disclosure. Further details of the processing system 105 will be described below with reference to FIG. 2.

Figure 2:
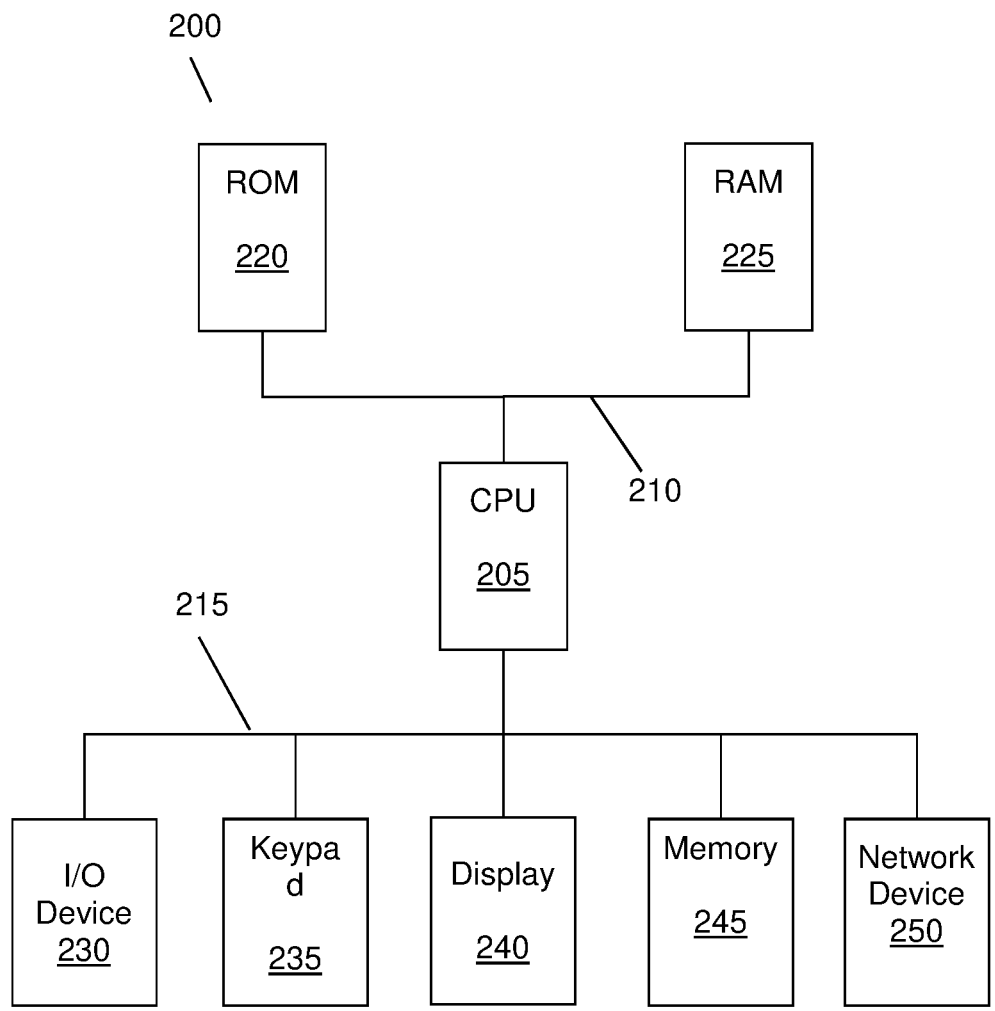
FIG. 2 illustrating a block diagram of a processing system of the server for providing a system in accordance with an embodiment of this disclosure.

Processes are stored as instructions in a media that are executed by a processing system in server 105 or a virtual machine running on the server 105 to provide the method and/or system in accordance with this disclosure. The instructions may be stored as firmware, hardware, or software. FIG. 2 illustrates processing system 200 such as the processing system in server 105 that execute the instructions to perform the processes for providing a method and/or system in accordance with this invention. One skilled in the art will recognize that the exact configuration of each processing system may be different and the exact configuration of the processing system in each device may vary. Thus, processing system 200 shown in FIG. 2 is given by way of example only.

Processing system 200 includes Central Processing Unit (CPU) 205. CPU 205 is a processor, microprocessor, or any combination of processors and microprocessors that execute instructions to perform the processes in accordance with the present invention. CPU 205 connects to memory bus 210 and Input/Output (I/O) bus 215. Memory bus 210 connects CPU 205 to memories 220 and 225 to transmit data and instructions between the memories and CPU 205. I/O bus 215 connects CPU 205 to peripheral devices to transmit data between CPU 205 and the peripheral devices. One skilled in the art will recognize that I/O bus 215 and memory bus 210 may be combined into one bus or subdivided into many other busses and the exact configuration is left to those skilled in the art.

A non-volatile memory 220, such as a Read Only Memory (ROM), is connected to memory bus 210. Non-volatile memory 220 stores instructions and data needed to operate various sub-systems of processing system 200 and to boot the system at start-up. One skilled in the art will recognize that any number of types of memory may be used to perform this function.

A volatile memory 225, such as Random Access Memory (RAM), is also connected to memory bus 210. Volatile memory 225 stores the instructions and data needed by CPU 205 to perform software instructions for processes such as the processes required for providing a system in accordance with this invention. One skilled in the art will recognize that any number of types of memory may be used as volatile memory and the exact type used is left as a design choice to those skilled in the art.

I/O device 230, keyboard 235, display 240, memory 245, network device 250 and any number of other peripheral devices connect to I/O bus 215 to exchange data with CPU 205 for use in applications being executed by CPU 205. I/O device 230 is any device that transmits and/or receives data from CPU 205. Keyboard 235 is a specific type of I/O that receives user input and transmits the input to CPU 205. Display 240 receives display data from CPU 205 and display images on a screen for a user to see. Memory 245 is a device that transmits and receives data to and from CPU 205 for storing data to a media. Network device 250 connects CPU 205 to a network for transmission of data to and from other processing systems.

Figure 3:
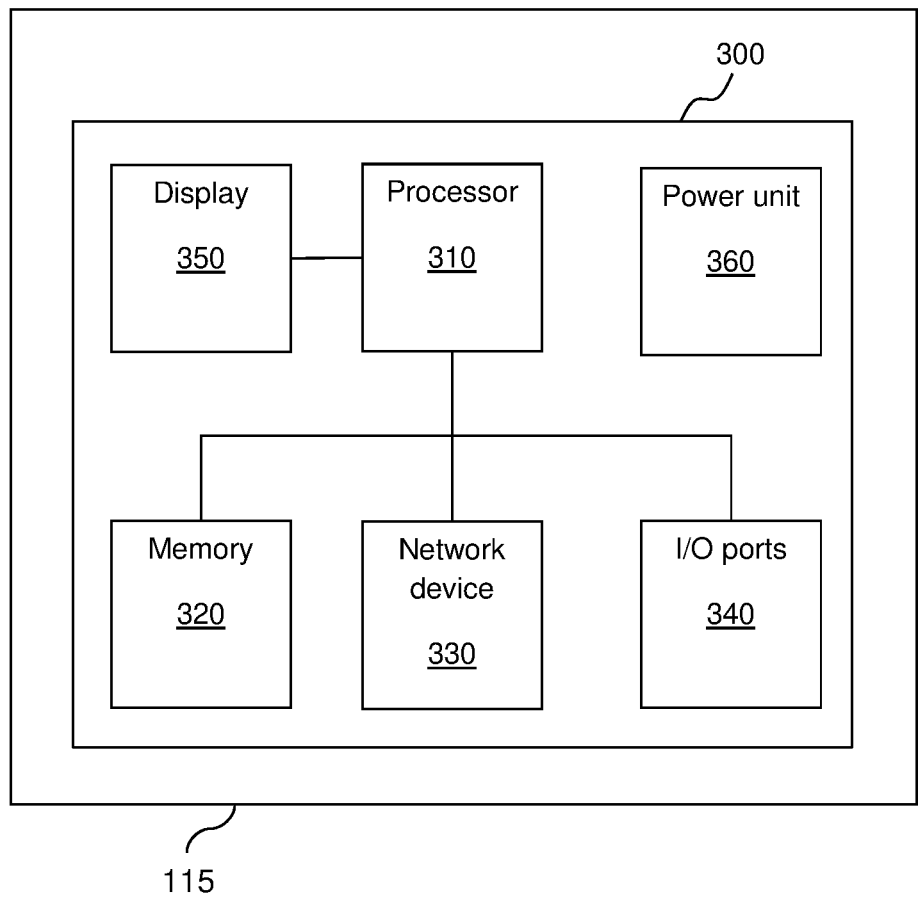
FIG. 3 illustrating a block diagram of a wireless device for providing a system in accordance with an embodiment of this disclosure.

In one embodiment, the image capturing devices 115 may be connected directly to the server 105 transmitting the sequence of images to the server 105. In particular, each image capturing devices 115 may be equipped with a network device to allow transferring and receiving of information over a wired or wireless connection. FIG. 3 illustrates the block diagram of a wireless device. The wireless device 300 can receive and transmit data, execute software applications. The wireless device 300 comprises a processor 310, memory 320, transceiver 330, input/output ports 340, display 350 and power unit 360. The wireless device 300 may be provided as part of the image capturing device 115.

The processor 310 is a processor, microprocessor, microcontroller, application specific integrated circuit, digital signal processor (DSP), programmable logic circuit, or other data processing device that executes instructions to perform the processes in accordance with the present invention. The processor 310 has the capability to execute various applications that are stored in the memory 320.

The memory 320 may include read-only memory (ROM), random-access memory (RAM), electrically erasable programmable ROM (EEPROM), flash cards, or any memory commonly used for computers.

Network device 330 connects processor 310 to a network for transmission of data to and from other processing systems such as server 105.

One or more input/output (I/O) ports 340 can be configured to allow the processor 310 to communicate with and control from various I/O devices. Peripheral devices that may be connected to wireless device 300 via the I/O ports 340 include the image capturing device 115, a USB storage device, an SD card or other storage device for transmitting information to or receiving information from the wireless device 120. In addition to updating applications stored on memory 320 or installing new applications onto the memory via the network device 330, a user may alternatively install new applications or update applications on the memory 320 through a user interface such as a USB via the I/O ports 340.

Display 350 receives display data from processor 310 and display images on a screen for a user to see. Display 350 may be a low power liquid crystal display (LCD) showing a variety of information for ease of identification and trouble shooting.

The wireless device 300 is powered by the power unit 360. Power unit 360 may be battery operated or direct feed from the power grid.

One skilled in the art will recognize that other features may be included in the wireless device 300. Further, the components in wireless device 300 may be replaced by other components that perform similar functions. In brief, the wireless device 300 as shown in FIG. 3 is considered merely illustrative and non-limiting.

In order to reduce the cost of having to furnish each wireless device 300 with 3G/4G communication capability, the wireless device 300 may be equipped with short and/or medium range wireless capability and wirelessly connects to a sub-server. The sub-server would subsequently transmit the sequence of images to the server 105. Essentially, the sub-server reduces the cost of having to furnish each wireless device 300 with 3G/4G communication capability. If future network communication protocol includes Internet of Things (IoT) communication at a more cost efficient rate, the wireless device 300 may be configured to transmit the sequence of images directly to the server 105.

Figure 4:
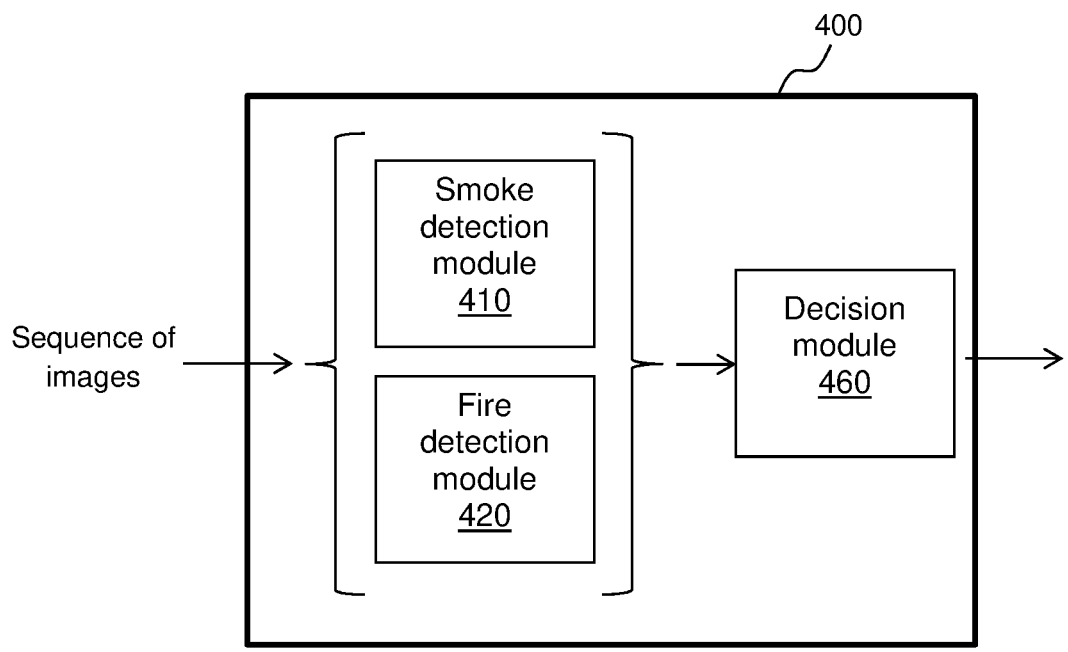
FIG. 4 illustrating an application executable by the server in accordance with this disclosure.

FIG. 4 illustrates a program 400 stored in memory or virtual memory of the server 105 for performing the processes in accordance with the disclosure. Program 400 includes a smoke detection module 410, a fire detection module 420, and a decision module 460. Briefly, the processes executed by the 3 modules are as follows:

1) Smoke detection module 410 determines and identifies the presence of a live smoke based on sequences of images received from the image capturing device. It also determines the wind direction and the possible areas that may be affected.
2) Fire detection module 420 determines and identifies the presence of fire based on sequences of images received from the image capturing device. It also predicts the type of materials being burnt.
3) Decision module 460 receives a result from the smoke detection module 410 and fire detection module 420 and decides on the course of action. The course of action is dependent on the type of surveillance required. If the surveillance is to monitor for the fire and smoke generated from an incinerator, the course of action would be to record the timing of the fire and smoke that exceeds a minimum acceptable requirement. If the surveillance is to trigger fire alarm to the affected area(s), an alarm would be triggered in the affected area and an alert report would be generated and transmitted to the fire department.

The processes of each of the modules will now be described as follows.

Figure 5:
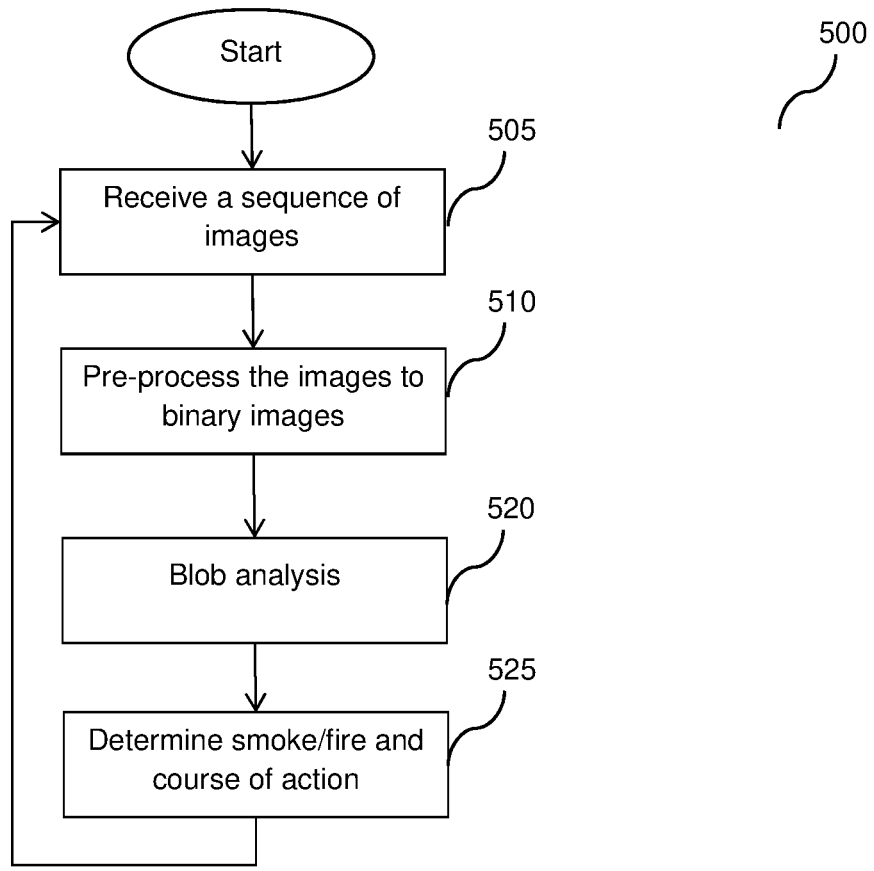
FIG. 5 illustrating a flow diagram of a process performed by the application in accordance with this disclosure.

FIG. 5 illustrates a flow chart of a process 500 executed by the program 400 in accordance with an embodiment of this disclosure. Process 500 begins with step 505 by receiving a sequence of images. The images are captured by the image capturing device 115. The images are sampled at certain intervals. For example, the sequence of images may be sampled at every 1 second and the sampled images are stored in the memory.

In step 510, the sampled images are then processed accordingly and converted to binary images. Specifically, the sampled images will be received by both smoke detection module 410 and fire detection module 420. Each of the smoke detection module 410 and fire detection module 420 will process the sampled images according to specific requirements in order for further analysis. Further details of the processing the sampled images will be described below.

In step 520, process 500 extracts the relevant objects from the respective processed images and analyses the relevant objects to determine for presence of smoke and/or fire. In relation to the smoke detection module 410, the relevant objects refer to Binary Large Object (BLOB) which are extracted from respective processed images and analysed to determine for presence of smoke. In relation to the fire detection module 420, the relevant objects refer to edges or contours of object which are extracted from respective processed images and analysed to determine for presence of fire. Further details of extraction will be described below.

In step 525, process 500 determines smoke and/or fire from the smoke and fire detection modules 410 and 420 and determines a course of action accordingly. Specifically, the decision module 460 determines the course of action based on the results received from smoke detection module 410 and fire detection module 420. The course of action is dependent on the type of surveillance required. If the surveillance is to monitor for the fire and smoke generated from an incinerator, the course of action would be to record the timing of the fire and smoke that exceeds a minimum acceptable requirement. If the surveillance is to monitor for fire and smoke, the decision module 460 will trigger a fire alarm to the affected area(s) upon detecting fire and/or smoke, an alert report would be generated and transmitted to the fire department. The surveillance may be implemented using images from cameras installed at various locations. Hence, the alert report will also include the relevant camera identification number and the location of the camera. Based on the location of the camera, the report may be transmitted to the nearest fire station. The type of burning materials may also be identified based on the smoke and fire signature. For example, if the intensity of the smoke is light, indicating close to white smoke, the fire may be starting to burn material. If the intensity of the smoke is heavy, indicating black smoke, the fire is volatile and the burning material may be vehicles or tires. Thereafter, if the intensity reduces, it indicates that the fire is slowing down and running out of burning material. In short, if the intensity of the smoke is heavy, it indicates a dangerous fire.

Process 500 repeats after step 525.

FIG. 6.1 illustrates a flow chart of process 600 executed by the smoke detection module 410 in accordance with an embodiment of this disclosure. Process 600 beings with step 605 by converting the sampled images to gray scale. Using the library of programming functions provided by OpenCV, the function to convert the sampled images to grayscale can be expressed as follows.

Function: cvSplit(mClrImage, NULL, mGryImg, NULL, NULL);

Input:

mClrImage—Current frame image pointer. It is a color image mGryImg—Gray Image pointer Essentially, step 605 converts RGB color image to a gray image. Gray image 605A in FIG. 6.2 illustrates an example of a converted gray image.

In step 610, process 600 applies background subtraction on each of the gray images. This effectively removes the background in each image since the current image is subtracted by previous image. In order words, if there are no changes in the sequence of images, the resultant images would be either black or white. That said, if there are certain changes such as presence of smoke or moving object, it would be obvious from the resultant image after applying background subtraction. The background subtraction can be expressed with the following expression.

1. Obtain subtraction images list.

$$S(n-1)=I_c(n)-I_p(n-1)$$

Where $I_c(n)$ is current frame image (in gray scale), $I_p(n-1)$ is previous $n^{th}$ frame image (in gray scale), n=1, . . . , k, S(n−1) is the background subtracted image of previous image, k is the number of sampled images (in gray scale).

Alternatively, the expression can be expressed as $$S(n)=I_c(n+1)-I_p(n)$$

Where S(n) is the background subtracted image of current image frame, $I_c(n+1)$ is next frame image (in gray scale), $I_p(n)$ is current $n^{th}$ image frame (in gray scale), n=1, . . . , k, and k is the number of sampled images (in gray scale).

2. Obtain an average image.

$$A=\Sigma S(n)/n$$

To detect minor change in frame images, it is better to average those values which are bigger than average difference value only. This averaging of images removes random noise. So, for every pixel x, y in new average image A', assume its value is A'$_{xy}$.

A'$_{xy}$=Σ$_{x,y}$S$_{x,y}$(n)/N, here N is the number of frame image where S$_{x,y}$(n) is bigger than A$_{xy}$.

A' is the return background image.

Using the library of programming functions provided by OpenCV, the function to apply background subtraction can be expressed as follows.

IplImage *GetImageByBgdSubstraction(std::vector <IplImage *> &pImgLst, IplImage *pCurImg, int cmpSize, int offset, CvRect *pRectRange)

Input:
pImgLst—The previous frame Image List pointer
pCurImg—The current Image pointer
cmpSize—comparing frame images number
offset—comparing frame images interval
pRectRange—The pointer to smoke detection ROIS
output:
return background subtraction image By implementing background subtraction, the smoke detection is capable of detecting very light smoke. It is also able to identify smoke effectively from other moving objects as well. Even if the smoke goes off from moving objects such as moving boats with smoke, it still can locate accurate smoke area. Image 610A in FIG. 6.2 illustrates an example of the resultant image after applying background subtraction on the converted gray image.

In step 615, process 600 converts the gray image from step 610 to binary image. A binary image is an image that has only two possible values for each pixel. Usually the two values are 0 or 255. Hence, in this step, for any pixel with a value above a certain threshold, that pixel would be converted to white 255. The remaining pixels are converted to black 0. Binary image 615A illustrates an example of the image 610A being converted to binary image.

In step 620, process 600 stores the binary images in the memory. Process 600 ends after step 620.

FIG. 7.1 illustrates a flow chart of process 700 executed by the smoke detection module 410 in accordance with an embodiment of this disclosure. Process 700 beings with step 705 by retrieving the processed images from process 600.

In step 710, process 700 extracts the Binary Large Object (BLOB) in each image. Image 710A in FIG. 7.2 illustrates an example of BLOBs being extracted. In image 710A, three BLOBs as identified by the boxes are extracted.

In step 715, process 700 determines the shape of BLOB. Specifically, the number of corners in each BLOB is determined. Further, the area of the BLOB is also determined.

In step 720, process 700 determines whether the shape is considered as a smoke. Specifically in this step, the number of corners in a BLOB is divided by the area of that BLOB to determine a shape value. If the shape value is above a certain threshold, the BLOB is considered a smoke and process 700 proceeds to step 725. Otherwise, process 700 ends. The threshold may be in the range of 0.001-0.1. Preferably, the threshold is 0.03.

Alternatively, the width of the BLOB is divided by the height of the BLOB and if the resultant value is less than 3, the BLOB is considered a smoke and process 700 proceeds to step 725. Otherwise, process 700 ends. For completeness, the area is determined based on the number of pixels in each BLOB while the width and height are determined based on the number of pixels in the horizontal axis (x axis) and vertical axis (y axis) respectively for each BLOB.

In step 725, process 700 determines the movement of the BLOBs that have been determined as smoke in step 720.

Specifically, process 700 determines whether the BLOBs are moving upwards. More specifically, BLOB in current frame is being compared with BLOB in previous frames. This information from determining the movement of the smoke may be critical in deciding the course of action. A BLOB is considered a movement of smoke when satisfying the following conditions:

1. the current BLOB overlaps with two previous BLOBs; and
2. the top coordinates of the current BLOB is smaller than the top coordinates of the two previous BLOBs.

In the software application, it is typical that we assume the top coordinates (0, 0) of one image is at the top-left. Inevitably, for an upward moving smoke, the top coordinates of smoke BLOB should be smaller than the top coordinates of the smoke BLOB from previous image. Hence, the conditions above are to first check that the BLOB from current image overlaps with each corresponding BLOB from two previous images (i.e. images from 2 earlier time frames), and that the top coordinates of the BLOB from current image are smaller than the top coordinates of the corresponding BLOBs from two previous images to indicate an upward moving smoke. The two previous images may be any two sampled images taken before the current sampled image. Alternatively, two previous images are two sampled images immediately preceding from the current sampled image. In other words, the BLOBs from the three images, namely, current image (n), first previous $i^{th}$ image (n-N1) and second previous image (n-N2) are used for determining whether the smoke is progressively moving upwards, where N1=5 and N2=10. This requires that the top coordinates of the BLOB in the current image (n) are smaller than the top coordinates of the BLOB in the first previous $i^{th}$ image (n-N1) and that the top coordinates of the BLOB in the first previous $i^{th}$ image (n-N1) are smaller than the top coordinates of the BLOB from the second previous $i^{th}$ image (n-N2). In short, the BLOB in the current image should be progressively moving upwards when compared with BLOBs from two previous images. One skilled in the art will recognise the values of N1 and N2 are variables which can be amended to other previous time frames and the exact values to be used are left to those skilled in the art.

Using the library of programming functions provided by OpenCV, the function to determine the upward movement of the BLOBs can be expressed as follows.

Function: void GetGoingUpRegions(std::vector <CvRec> &rectL.st)

Input:
rectLst—Blobs position lists in current frame image

In short, process 700 determines the BLOB is considered a smoke if the current BLOB overlaps with previous BLOB, the top coordinates of current BLOB become smaller at least two times of the bottom coordinates of the current BLOB, and the range is within a pre-determined range. If the BLOB is a smoke, process 700 proceeds to step 730. Otherwise, process 700 ends. Image 725A in FIG. 7.2 illustrates an example of BLOBs being determined to be upward moving. In image 725A, two of the three BLOBs are identified as upward moving. Specifically, the smallest BLOB as identified in image 710A is omitted from image 725A as that BLOB is not considered upward moving. This is possibly because the BLOB is too small and the current BLOB may not overlap with its previous BLOB.

In step 730, process 700 removes moving object. This step involves removing object from smoke and fire. Specifically, it is noted that a moving object will move in fairly constant speed as oppose to smoke or fire. Hence, this step identifies moving object by measuring the speed of movement of a BLOB. The process of the speed of movement of a BLOB is as follows.

1) Determine maximum smoke range
2) Detect some good feature points in the moving region in the current frame.
3) Use optical flow to track the points in previous $i^{th}$ frame.
4) Use optical flow to track the points in previous $(i*2)^{th}$ frame.

Assume the coordinate of one of good feature points is ($x_0$, $y_0$). The coordinate of its' corresponding point in previous $i^{th}$ frame is ($x_i$, $y_i$); and the coordinate of its corresponding point in previous $(i*2)^{th}$ frame is ($x_{2i}$, $y_{2i}$); if they match the following equations and condition, the point will be considered as being from moving objects.

$x_i-x_0$ is about the same as $x_{2i}-x_i$ And $y_i-y_0$ is about the same as $y_{2i}-y_i$, one of the absolute value of $x_i-x_o$ and $y_i-y_o$ must be bigger than a predefined threshold value.

The maximum smoke range essentially combines adjacent or overlapping BLOB to form a single BLOB. Image 730A in FIG. 7.2 illustrates an example of adjacent or overlapping BLOBs being combined to form a single BLOB.

The good feature points are detected based on Shi-Tomasi Corner Detector. One skilled in the art will recognise that other method of detecting good feature points may be implemented without departing from the disclosure. For example, one skilled in the art may use Harris Corner Detector instead. The good feature points are detected in the following manner. First, it retrieves the grayscale image within the BLOB. Thereafter, it detects a number of strongest corners in the grayscale image by Shi-Tomasi method (or alternatively, the Harris Corner Detection). In order to use the Shi-Tomasi method, user has to indicate the number of strongest corners to be determined and specify the quality level ranging between 0-1 that denotes the minimum quality of corner below which everyone is rejected.

Figure 8:
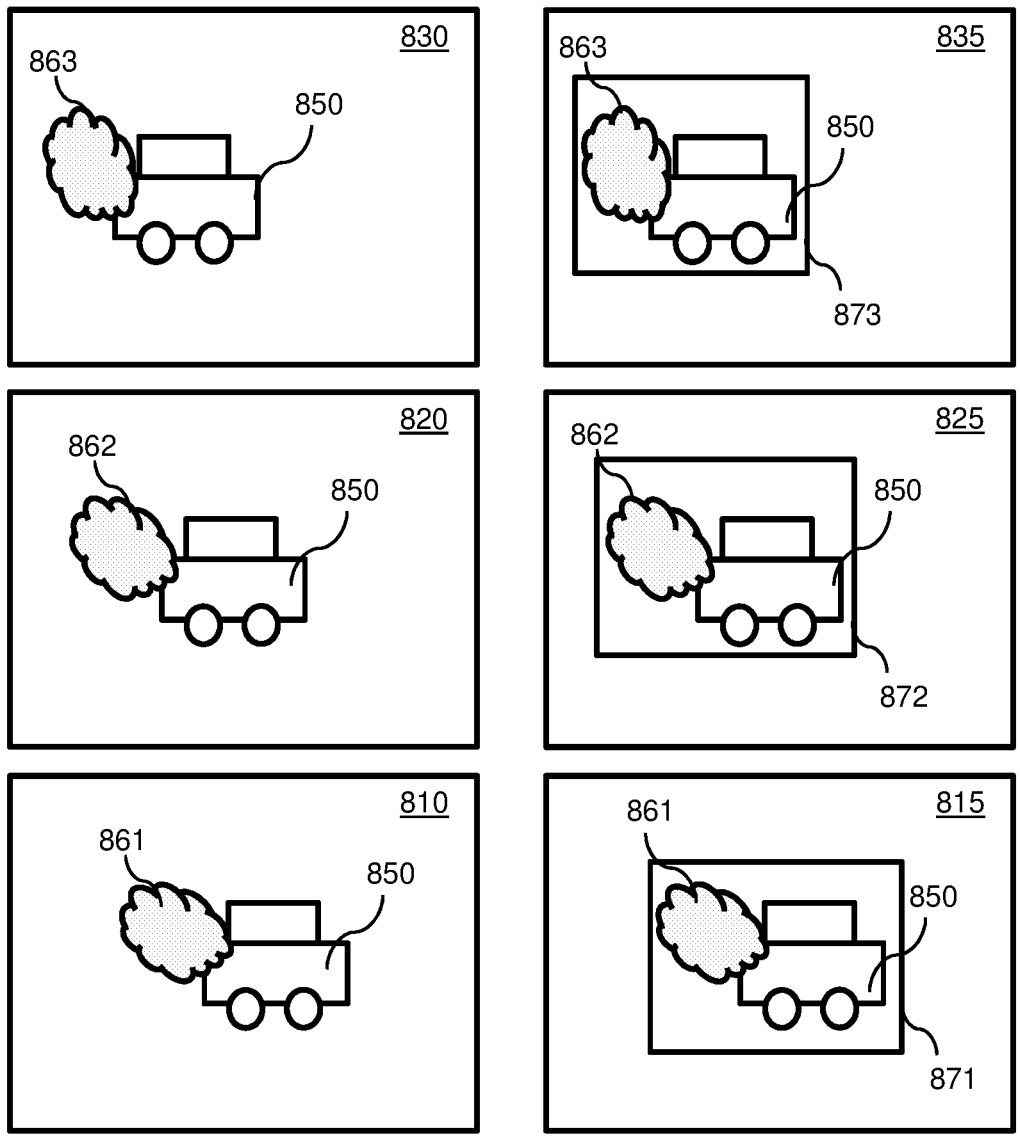
FIG. 8 illustrating the images required in step 730 of the process as shown in FIG. 7 in accordance with this disclosure.
Figure 9:
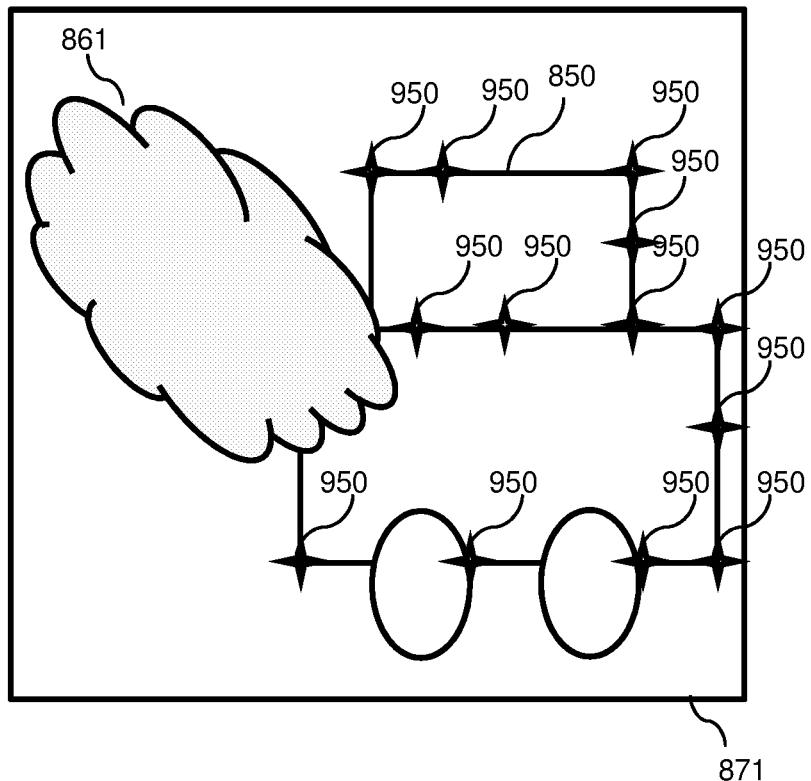
FIG. 9 illustrating the good feature points identified in accordance with this disclosure.

FIG. 8 illustrates the step 730 of process 700 in accordance with this disclosure. Specifically, frame 810 illustrates the current image frame, frame 820 illustrates the previous $i^{th}$ image frame, frame 830 illustrates the previous $(i*2)^{th}$ image frame, frame 815 illustrates the current image frame with identified BLOB 871, frame 825 illustrates the previous $i^{th}$ image frame with identified BLOB 872, and frame 835 illustrates the previous $(i*2)^{th}$ image frame with identified BLOB 873. The frames 810-835 include a moving vehicle 850 and the corresponding smoke 861-863 generated by the moving vehicle in the current and 2 previous frames. Applying the Shi-Tomasi method on the gray scale image within the BLOB 871, good feature points 950 will be detected. Essentially, the good feature points 950 are corners or edges. It should be noted that it would be difficult to detect good feature points within the smoke since corners or edges are unlikely to be available within the smoke. Hence, as shown in FIG. 9, the good feature points 950 are detected along the edges or corners of the vehicle 850. After the good feature points are determined, the process uses optical flow to track the points that correspond to the good feature points in previous $i^{th}$ frame and $(i*2)$th frame. After the corresponding points are tracked and determined, the process determines whether the identified feature points belong to moving objects in the following manner. Assuming the coordinate of one of good feature points is ($x_0$, $y_0$). The coordinate of its' corresponding point in previous iframe is ($x_i$, $y_i$); and the coordinate of its corresponding point in previous $(i*2)^{th}$ frame is ($x_{2i}$, $y_{2i}$); if they match the following equations and condition, the point will be considered as being from moving objects.

$x_i-x_0$ is about the same as $x_{2i}-x_i$ And $y_i-y_0$ is about the same as $y_{2i}-y_i$, one of the absolute value of $x_i-x_o$ and $y_i-y_o$ must be bigger than one predefined threshold value. This is to ensure that the object is moving.

It should be noted that smoke does not move in a constant manner compared to a vehicle. Hence, the points that correspond to the identified feature points (within the smoke) in previous ith frame and $(i*2)$th frame are unlikely to be accurately determined. Therefore, $x_i-x_0$ would be very different from $x_{2i}-x_i$ And $y_i-y_0$ would be very different from $y_{2i}-y_i$ as well.

Figure 10:
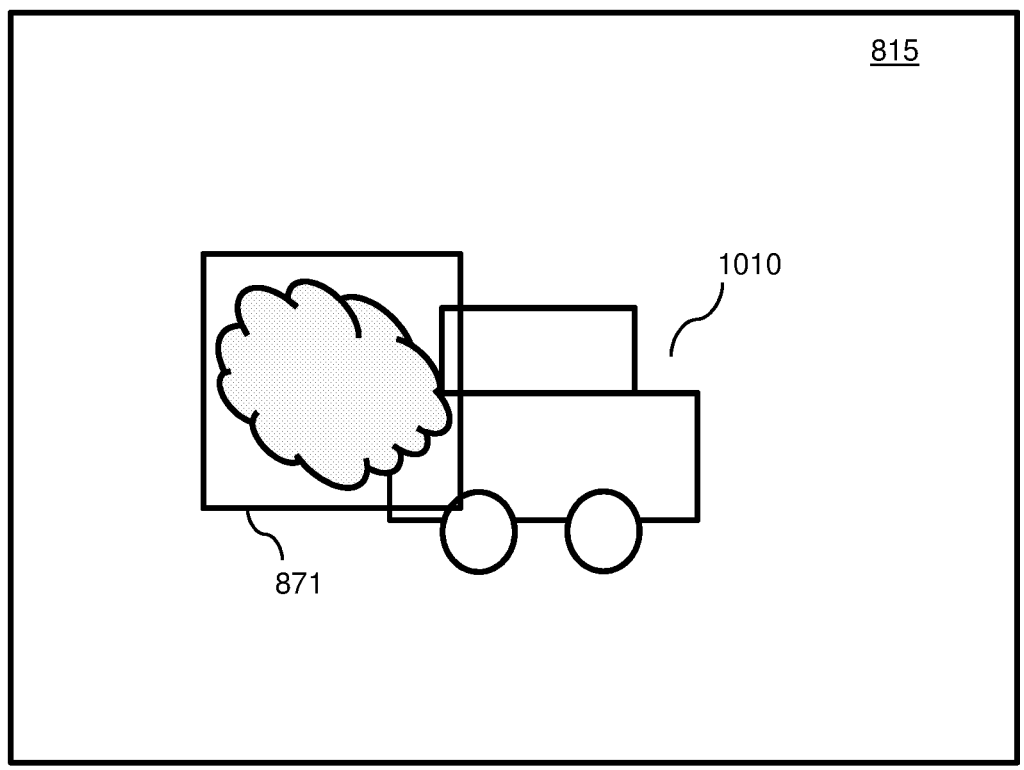
FIG. 10 illustrating a modified BLOB appended to a processed image in accordance with this disclosure.

FIG. 10 shows the modified BLOB 871 appended to the processed image. Specifically, original BLOB 871 has been shrunk, removing the moving object and more accurately identifying the smoke.

Algorithm:
1) Determine maximum smoke range, rectBin
2) Detect some points with good feature in the region rectBin (opencv Function: goodFeaturesToTrack( ))
3) Use optical flow to track the points in previous ith frame.(opencv Function: calcOpticalFlowPyrLK( ))
4) Use optical flow to track the points in previous 2ith frame.
5) Remove the points which go through the same distance from previous ith frame to current frame with previous 2ith frame to previous ith frame.
6) Determine the new smoke area rectBin The maximum smoke range, rectBin can be determined in the following manner.
Function: CvRect GetMaximumRectangleFromMovingBin (CvRect range, std:: vector <std::vector <SMOKE_FEATURE>> &rectLists)
Input:
range—Detection ROI Range
rectLists—blob list from background subtraction image
Output:
Smoke maximum Range, rectBin In step 735, process 700 determines the intensity of the smoke. First, the original color image is required to ensure that the identified BLOB is a real smoke and not a fire. This is because smoke and fire usually occur at the same time. This step requires process 700 to retrieve the sampled original color image and overlay the binary image with the BLOB over the corresponding sampled original image. Thereafter, to avoid mistaking fire as smoke, the following algorithm is used to exclude the fire. In one connected blob, if the average color channel R, G, B values, obtained from the sampled original color image, meet the following requirement, $$R>(G+B)/2+R/8$$

The blob will be considered as fire and be excluded from smoke detected area.

Next, process 700 calculates the smoke blob Histogram H. To get accurate smoke intensity level, suppose its value is T, we make T to match the following condition, $$\frac{A}{4} = \sum_{k=0}^{T} H(k),$$

where A is the total blob area, H is the blob histogram, T is the smoke intensity level, and k is the intensity variable which ranges between 0 to 255. The total blob area, A, is divided by 4 is to get more accurate smoke intensity level.

The function to determine intensity of the smoke can be expressed as follows.
Function: int GetBlackIntenFromBlob(IplImage *pGrayImg, BlobRect *pRect, int *totalAreaRes, int *totalInterRes, bool bHalf)
Input:
pGrayImg—Gray Image Pointer
pRect—The pointer to smoke blob structure including all smoke pixels coordinates
totalAreaRes—For saving the total of smoke area
totalIntenRes—For saving the total of all pixels smoke intensity
bHalf—Detect only the half at the bottom or not. This is because the black smoke are usually at the bottom. If bHalf is set as true, total blob area, A, is only calculated for the bottom half of the blob. The parameter is to get more accurate smoke intensity level.
Output:
Average smoke intensity level Process 700 ends after step 735.

FIG. 11.1 illustrates a flow chart of process 1100 executed by the fire detection module 420 in accordance with an embodiment of this disclosure. Process 1100 beings with step 1105 by converting the sampled images to gray scale. Image 1105A in FIG. 11.2 illustrates the converted gray scale image.

In step 1110, process 1100 applies background subtraction using the gray images to produce foreground images. This effectively removes the background in each image since the current image is subtracted by previous image. In order words, if there are no changes in the sequence of images, the resultant images would be either black or white. This step is similar to step 610 of process 600. However, in step 1110, an average image is not required. Image 1110A in FIG. 11.2 illustrates the resultant image after applying background substraction on the gray scale image 1105A.

In step 1115, process 1100 converts the foreground images to Hue, Saturation and lightness (HSL) space. Specifically, the pixel will be amended to 1 if the pixel satisfies the following conditions:
1. Hue value=0~60;
2. Saturation value=0~75; and
3. Lightness value=85~100.

The rest of the pixels will be amended to 0.

Image 1115A in FIG. 11.2 illustrates the foreground images in HSL space.

In step 1120, process 1100 applies a morphological algorithm on the HSL foreground images. This dilates the HSL foreground images for better edge extraction performed in the next step. Image 1120A in FIG. 11.3 illustrates the resultant image after applying a morphological algorithm on the HSL foreground image 1115A.

In step 1125, process 1100 applies an edge extraction algorithm to obtain the contours. Hence, different from the smoke detection module 410 which analyses smoke using BLOB, the fire detection module 420 analyses fire using contours. Canny edge extraction algorithm may be used to obtain the contours. One skilled in the art will recognise that other edge extraction algorithm may be used without departing from the disclosure. Image 1125A in FIG. 11.3 illustrates the contour image.

In step 1130, process 1100 stores the images with contours and the original image. Process 1100 ends after step 1130.

FIG. 12.1 illustrates a flow chart of process 1200 executed by the fire detection module 420 in accordance with an embodiment of this disclosure. Process 1200 is a process of analyzing the images with contours to filter out contours that are not considered to be fire. Process 1200 beings with step 1205 by determining the roundness of each of the contours. The roundness of each contour is determined as follows. First, we determine the following expression, $$A_x = \sum_{n=1}^{N} \frac{X_n}{N}$$

$$A_y = \sum_{n=1}^{N} \frac{Y_n}{N}$$

$$A = (A_x, A_y)$$

$$D_n = (x_n, y_n)$$

$$D_A = \sum_{n=1}^{N} \frac{D_n}{N}$$

$$T = 1 - \sum_{n=1}^{N} \frac{|D_A - D_n|}{N}$$

where N is the total amount of pixels in the contour, $X_n$ and $Y_n$ are the coordinates of a pixel within the contour. T is a roundness index where 1 equates to a perfect circle and other shape will decrease in value; $A_x$ is the average of X coordinate for all contour pixels, $A_y$ is the average of Y coordinate for all contour pixels, $D_n$ is the distance between $n^{th}$ point in the contour and the average center $A_n(x_n, y_n)$, and $D_A$ is the average distance of all contour pixels with reference to A. The distance between two points is determined using Pythagorean theorem. FIG. 13 illustrates a fire with a contour 1320 being the perimeter of the fire. The average coordinates of the contour pixels, A 1310, is determined by determining the average of X and Y coordinates for all contour pixels. Thereafter, the distance between the contour pixel with reference to A is determined for all contour pixels. The average distance of all contour pixels with reference to A, $D_A$, is then determined. Lastly, roundness index, T, is determined by applying the above expression. If T is above a certain threshold, the contour is considered a fire. Preferably, the threshold is 0.9. One skilled in the art will recognise that the actual threshold may differ from the preferred threshold of 0.9 and the exact threshold to be implemented is left as a design choice to those skilled in the art. Image 1205A in FIG. 12.2 illustrates the contours belonging to fire. Specifically, a box in image 1205A is used to identify the contours belonging to fire. The contours outside the box are not identified to be fire. For the avoidance of doubt, image 1205A is derived based on the examples shown in FIGS. 11.2 and 11.3.

In step 1210, process 1200 determines the size of the fire. First, it extracts and divides the contours into different groups. Specifically, connecting contours are grouped together. Image 1210A in FIG. 12.2 illustrates the extracted contours where 8 groups (marked by the boxes) are determined. The left and width of each box is determined.

In step 1215, process 1200 removes contours with T<0.9 and/or contour box with width<W and height<H. W and H are the thresholds of width and height respectively. Preferably, W=H=5. Process 1200 ends after step 1215.

The above is a description of embodiments of a system in accordance with the disclosure as set forth below. It is envisioned that those skilled in the art can and will design alternative embodiments of this disclosure based upon this disclosure that infringe on this disclosure as set forth in the following claims.

The invention claimed is:

1. A smoke detection system comprising:
   a processor, a memory and instructions stored on the memory and executable by the processor to:
   receive a sequence of images from a plurality of cameras;
   sampling the sequence of images at a certain interval;
   process each of the sampled images to form a first processed image;
   extract Binary Large Objects (BLOBs) from first processed image;
   analyse the BLOB for smoke;
   determine smoke in response to analysing smoke from the BLOBs;
   process each of the sampled images to form a second processed image;
   extract contours of objects from the second processed image;
   analyse the contours of objects for fire; and
   determine fire in response to analysing fire from the contours of objects,
   wherein the instruction to analyse the contours of objects for fire comprises instructions to:
   determine an average of X and Y coordinates for all contour pixels;
   determine a distance, $D_n$, between each contour pixel with reference to the average of X and Y coordinates for all contour pixels;
   determine an average distance, $D_A$, of all contour pixels with reference to the average of X and Y coordinates for all contour pixels;
   determine a roundness index, T, is determined by applying the following expression,
   $T = 1 - \Sigma^{N/n=1} |DNA - Dn|/N$
   where N is the total amount of pixels in the contour, and remove contours with T<0.9.

2. The smoke detection system according to claim 1 wherein the instruction to analyse the contours of objects for fire comprises instructions to:
   determine a width, W, and a height, H, of each contour; and
   remove contours with width less than a first predetermined length and height less than a second predetermined length.

3. The smoke detection system according to claim 1 wherein the instruction to convert the background subtracted images to binary images comprises instruction to:
   convert each pixel with a value above a certain threshold to 255 and 0 for the remaining pixels.

4. The smoke detection system according to claim 3 wherein the instruction to extract Binary Large Objects (BLOBs) from first processed image comprises instruction to:
   extract the BLOBs in each binary image.

5. The smoke detection system according to claim 3 wherein the instruction to analyse the BLOBs for smoke comprises instruction to:
   determine shape of BLOBs.

6. The smoke detection system according to claim 5 wherein the instruction to determine shape of BLOBs comprises instructions to:
   determine number of corners and area of each BLOB;
   divide the number of corners by the area for each BLOB to determine a shape value for each BLOB;
   in response to the shape value being above a certain threshold, determine the BLOB as a smoke.

7. The smoke detection system according to claim 6 wherein the certain threshold value is in the range of 0.001 - 0.1.

8. The smoke detection system according to claim 7 wherein the instruction to analyse the BLOB for smoke further comprises instructions to:
   determine a movement of the BLOBs that are determined as smoke;
   determine the BLOB is a movement of smoke in response to the BLOBs satisfying the following conditions:
   1. current BLOB overlaps with two previous BLOBs; and
   2. top coordinates of the current BLOB is smaller than the top coordinates of the two previous BLOBs.

9. The smoke detection system according to claim 8 wherein the instruction to analyse the BLOB for smoke further comprises instructions to:
   remove moving object.

10. The smoke detection system according to claim 9 wherein the instruction to remove moving object comprises instructions to:
    1). determine a maximum smoke range;
    2). detect some good feature points in the moving region in the current frame;
    3). use optical flow to track the points, $(x_i, y_i)$, in previous ith frame;
    4). use optical flow to track the points, $(x_{2i}, y_{2i})$, in previous $(i*2)^{th}$ frame;
    5). consider a point as a moving object in response to $x_i - x_0$ is about the same as $x_{2i} - x_i$ And $y_i - y_0$ is about the same as $y_{2i} - y_i$, one of the absolute value of $x_i - x_o$ and $y_i - y_o$ is bigger that a predefined threshold value.

11. The smoke detection system according to claim 9 wherein the instruction to analyse the BLOB for smoke further comprises instructions to:
    determine the intensity of the smoke.

12. The smoke detection system according to claim 11 wherein the instruction to determine the intensity of the smoke comprises instructions to:
    retrieve the sampled images;
    overlay the binary images with the BLOBs over corresponding sampled images;
    exclude BLOBs with average color channel R, G, B values that meet the following requirement: R>(G+B)/2=R/8;
    calculate a smoke BLOB Histogram, H;
    match the following condition, $$\frac{A}{4} = \sum\nolimits_{k=0}^{T} H(k)$$

where A is an area of a BLOB, H is the BLOB histogram, T is the smoke intensity level, and k is the intensity variable which ranges between 0 to 255.

13. A smoke detection system comprising:
    a processor, a memory and instructions stored on the memory and executable by the processor to:
    receive a sequence of images from a plurality of cameras;
    sampling the sequence of images at a certain interval;
    process each of the sampled images to form a first processed image;

extract Binary Large Objects (BLOBs) from first processed image;
analyse the BLOB for smoke; and
determine smoke in response to analysing smoke from the BLOBs, wherein the instruction to process each of the sampled images to form the first processed image comprises instructions to:
convert the sampled images to gray scale;
apply background subtraction on the gray scale sampled images for k number of sampled images with the following expression:

$$S(n)=1_c(n+1)-1_p(n)$$

where $S(n)$ is the background subtracted image of current sampled image, $1_c(n+1)$ is next sampled image, $1_p(n)$ is current sampled image, $n=1, \ldots, k$;
average the background subtracted image for every pixel (x, y) to form a new average image A, with the following expression:

$$A=\Sigma S(n)/k; \text{ and}$$

convert the average background subtracted images to binary images;
wherein the instructions further comprises instructions to:
process each of the sampled images to form a second processed image;
extract contours of objects from the second processed image;
analyse the contours of objects for fire; and
determine fire in response to analysing fire from the contours of objects; and
wherein the instruction to process each of the sampled images to form the second processed image comprises instructions to:
convert the sampled images to gray scale;
apply background subtraction on the gray scale sampled images to obtain foreground images; and
convert the foreground images to Hue, Saturation and lightness (HSL) space;
apply a morphological algorithm on the HSL foreground images; and
apply an edge extraction algorithm to obtain the contours in each foreground images; and
wherein the instruction to analyse the contours of objects for fire comprises instructions to:
determine an average of X and Y coordinates for all contour pixels;
determine a distance, $D_n$, between each contour pixel with reference to the average of
X and Y coordinates for all contour pixels;
determine an average distance, $D_A$, of all contour pixels with reference to the average of X and Y coordinates for all contour pixels;
determine a roundness index, T, is determined by applying the following expression, $$T = 1 - \sum\nolimits_{n=1}^{N} |DA-Dn|/N$$

where N is the total amount of pixels in the contour, and remove contours with T<0.9.

14. A smoke detection system comprising:
a processor, a memory and instructions stored on the memory and executable by the processor to:
receive a sequence of images from a plurality of cameras;
sampling the sequence of images at a certain interval;
process each of the sampled images to form a first processed image;
extract Binary Large Objects (BLOBs) from first processed image;
analyse the BLOB for smoke; and
determine smoke in response to analysing smoke from the BLOBs, wherein the instruction to process each of the sampled images to form the first processed image comprises instructions to:
convert the sampled images to gray scale;
apply background subtraction on the gray scale sampled images for k number of sampled images with the following expression:

$$S(n)=1_c(n+1)-1_p(n)$$

where $S(n)$ is the background subtracted image of current sampled image, $1_c(n+1)$ is next sampled image, $1_p(n)$ is current sampled image, $n=1, \ldots, k$.
average the background subtracted image for every pixel (x, y) to form a new average image A, with the following expression:

$$A=\Sigma S(n)/k; \text{ and}$$

convert the average background subtracted images to binary images;
wherein the instructions further comprises instructions to:
process each of the sampled images to form a second processed image;
extract contours of objects from the second processed image;
analyse the contours of objects for fire; and
determine fire in response to analysing fire from the contours of objects; and
wherein the instruction to process each of the sampled images to form the second processed image comprises instructions to:
convert the sampled images to gray scale;
apply background subtraction on the gray scale sampled images to obtain foreground images; and
convert the foreground images to Hue, Saturation and lightness (HSL) space;
apply a morphological algorithm on the HSL foreground images; and
apply an edge extraction algorithm to obtain the contours in each foreground images; and
wherein the instruction to analyse the contours of objects for fire comprises instructions to:
determine a width, W, and a height, H, of each contour; and
remove contours with width less than a first predetermined length and height less than a second predetermined length.

\* \* \* \* \*